United States Patent [19]
Chien

[11] Patent Number: 5,806,960
[45] Date of Patent: Sep. 15, 1998

[54] UNIVERSAL SAFETY LIGHT WITH EL ELEMENT

[76] Inventor: Tseng Lu Chien, 8F, No. 29, Alley 73, Lin-Shen Street, Shi-Chi Town, Taipei, Hsong, Taiwan

[21] Appl. No.: 746,381

[22] Filed: Nov. 8, 1996

[51] Int. Cl.⁶ ........................................ F21V 9/16
[52] U.S. Cl. .................. 362/84; 362/190; 362/200
[58] Field of Search .................... 362/84, 103, 190, 362/191, 158, 267, 293, 157, 186, 200

[56] References Cited

U.S. PATENT DOCUMENTS

| | | | |
|---|---|---|---|
| 4,144,557 | 3/1979 | Kerr, III et al. | 362/84 |
| 4,788,629 | 11/1988 | Handy et al. | 362/84 |
| 4,949,228 | 8/1990 | Lin et al. | 362/72 |
| 5,245,517 | 9/1993 | Fenton | 362/84 |
| 5,253,150 | 10/1993 | Vanni | 362/84 |
| 5,268,827 | 12/1993 | Granneman et al. | 362/84 |
| 5,317,488 | 5/1994 | Penrod | 362/84 |
| 5,406,724 | 4/1995 | Lin | 36/137 |
| 5,408,764 | 4/1995 | Wut | 36/137 |
| 5,465,197 | 11/1995 | Chien | 362/203 |
| 5,515,247 | 5/1996 | Cheung et al. | 362/84 |
| 5,548,565 | 8/1996 | Aoyama et al. | 362/103 |
| 5,552,971 | 9/1996 | Madden | 362/103 |
| 5,599,088 | 2/1997 | Chien | 362/103 |

*Primary Examiner*—Alan Cariaso
*Attorney, Agent, or Firm*—Bacon & Thomas

[57] ABSTRACT

A universal safety light includes a housing enclosing an electro-luminescent element and a transparent area for enabling viewing of the electro-luminescent element, the housing also enclosing a DC power source and all electrical circuit means required for supplying power from said DC power source to said electro-luminescent element, including an AC/DC inverter circuit and a switch for turning said electro-luminescent element on and off according to predetermined times and cycles, and an attachment device for attaching the universal safety light to a variety of objects.

21 Claims, 11 Drawing Sheets

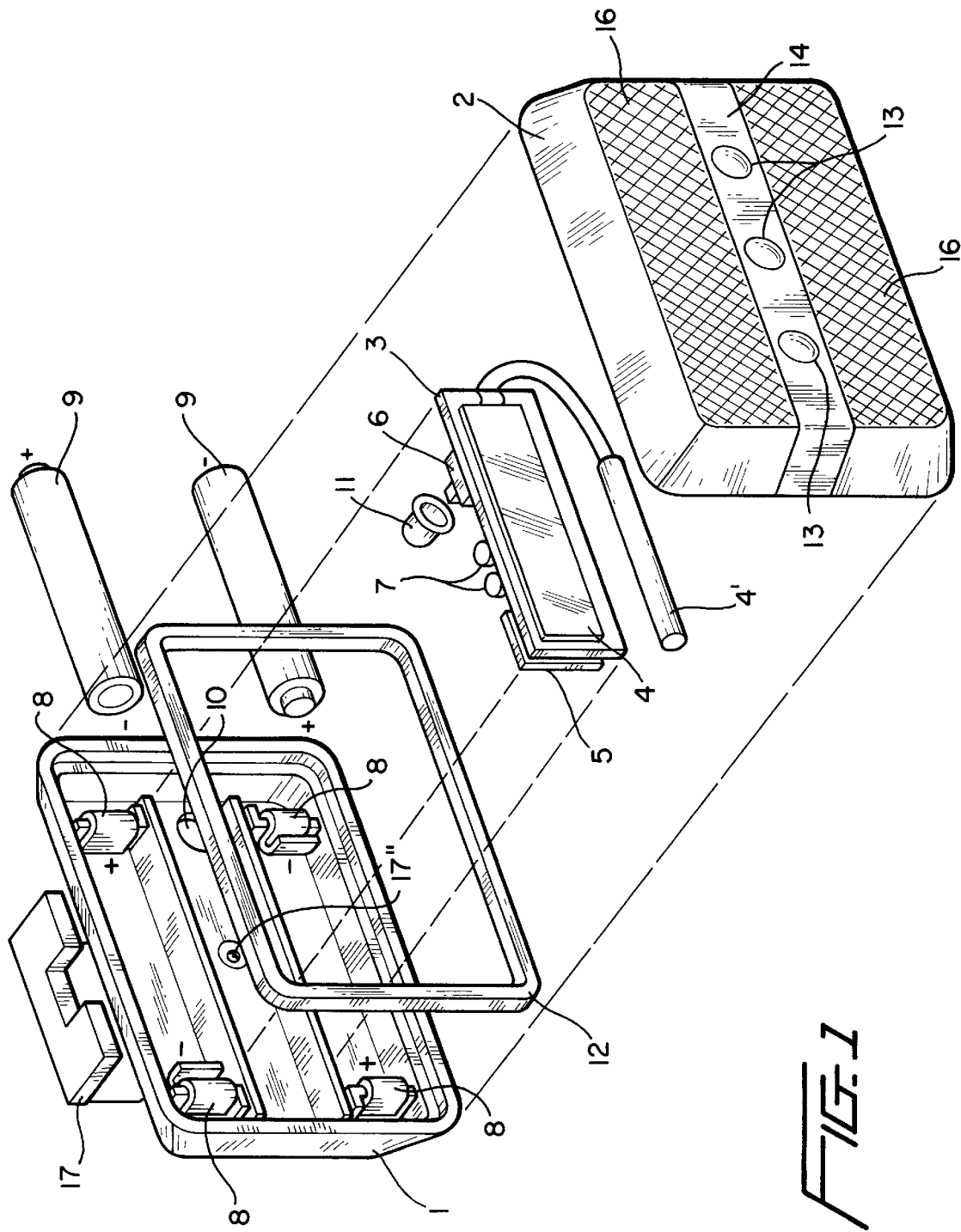

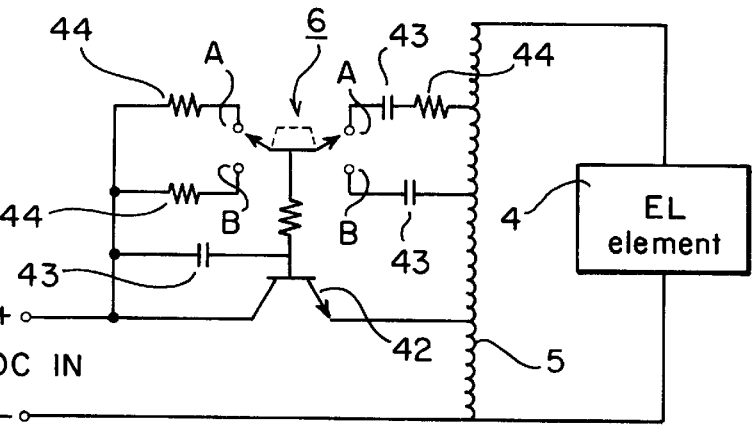
FIG. 3-1
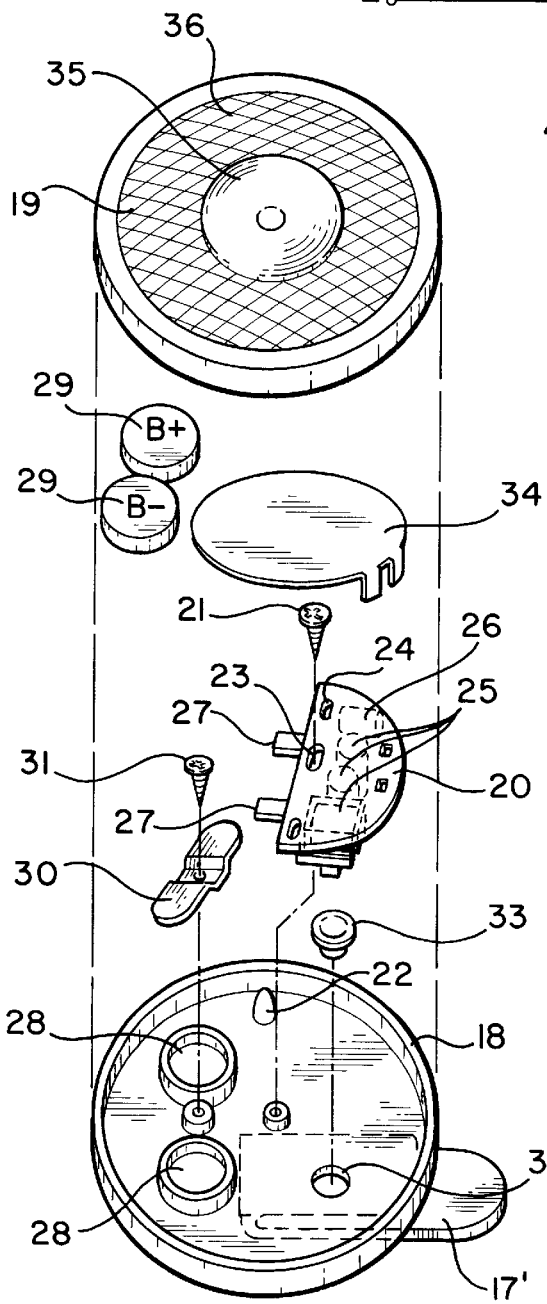
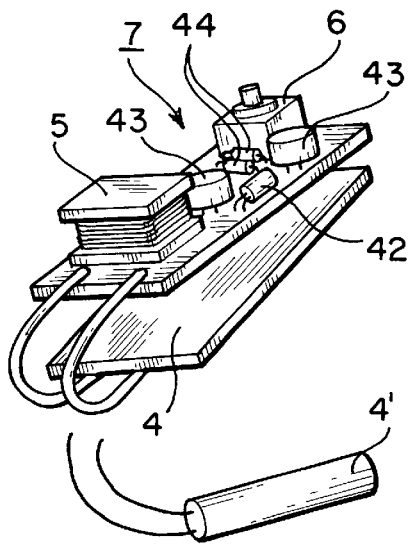
FIG. 3
FIG. 1-1

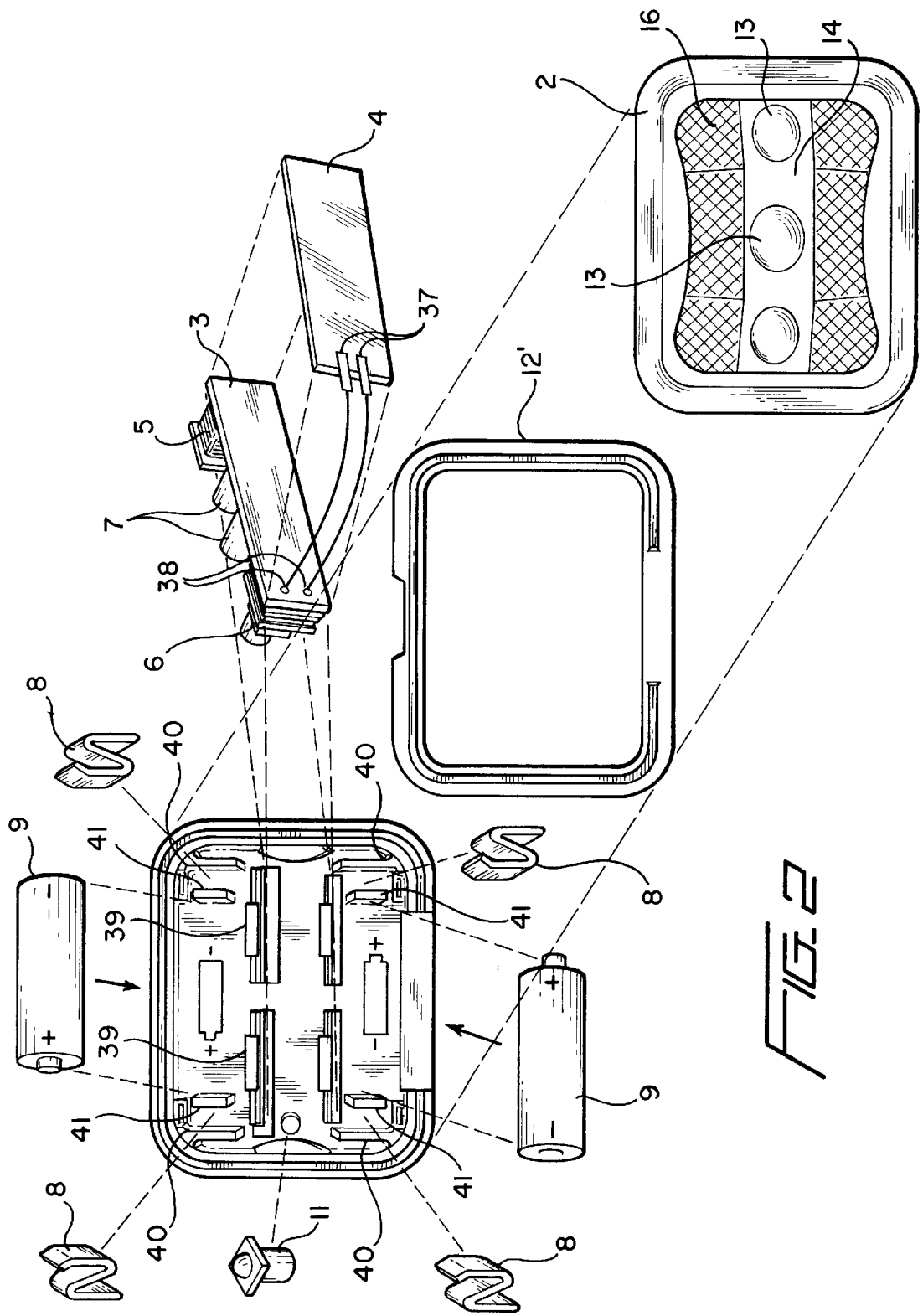

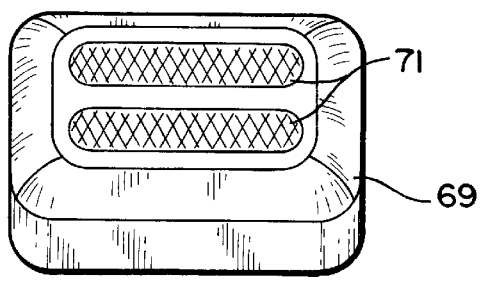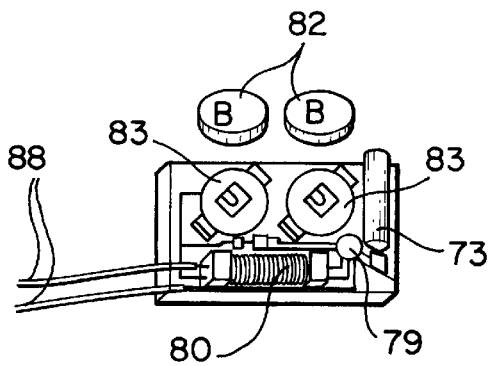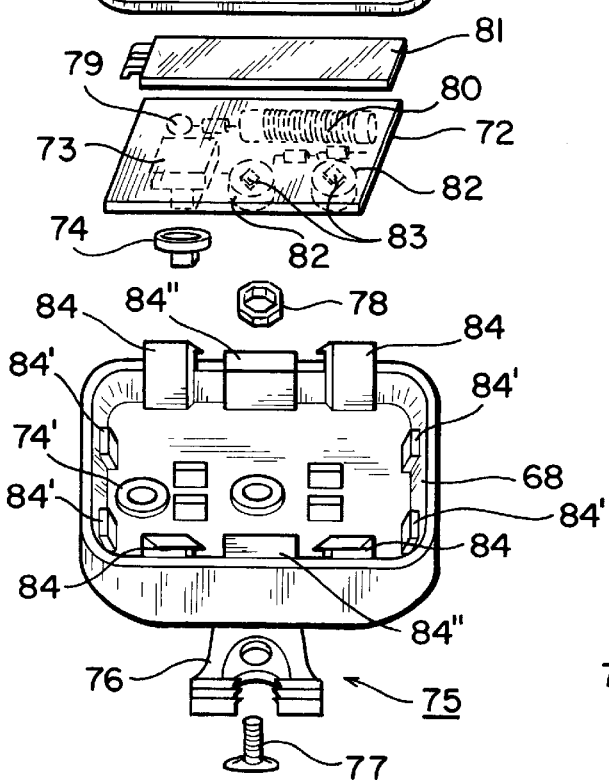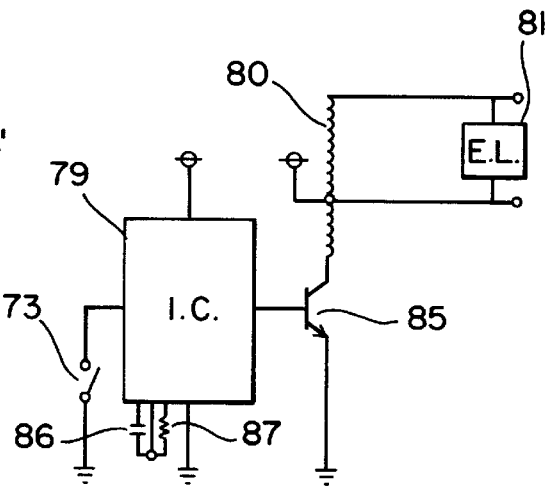

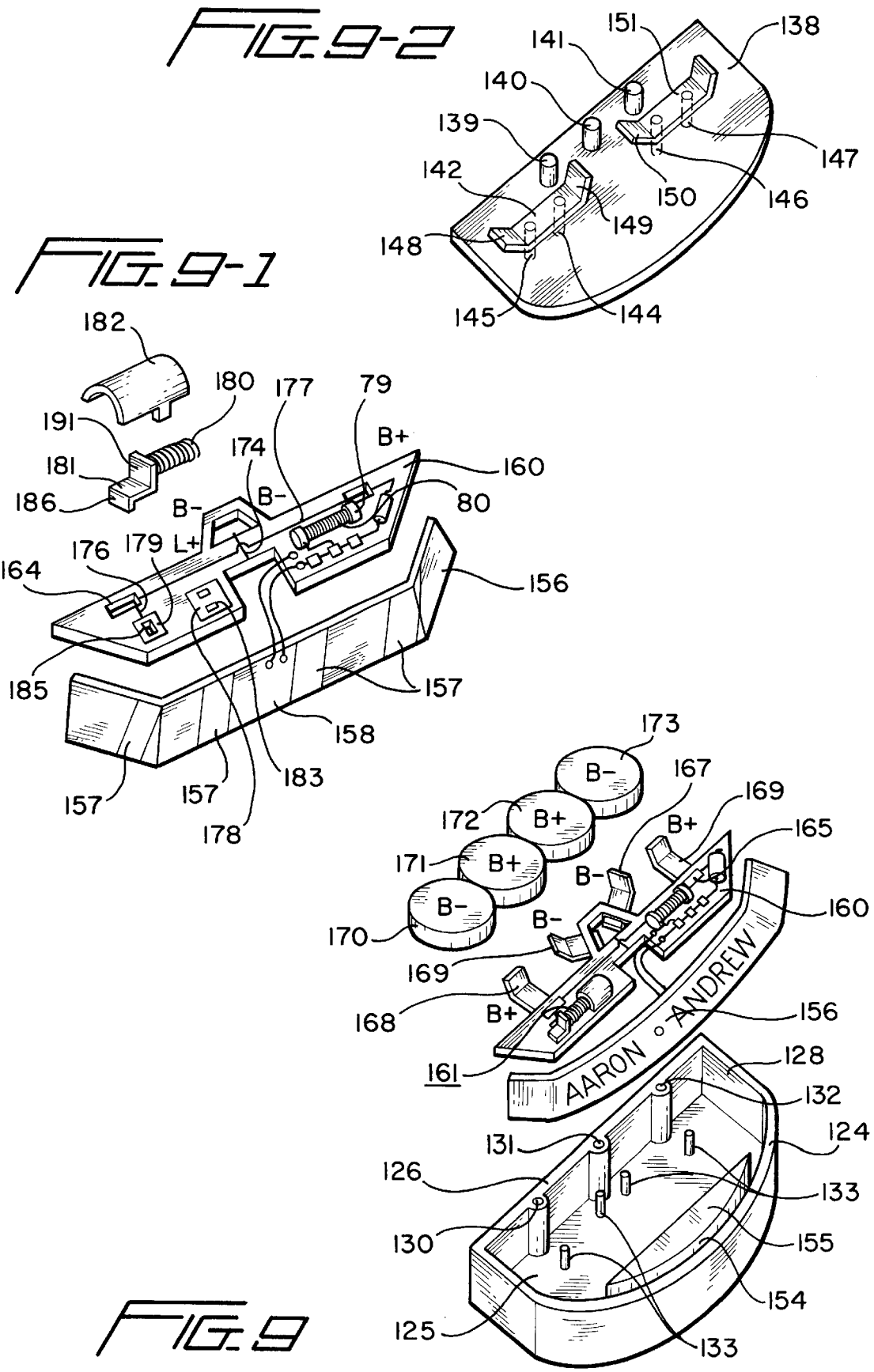

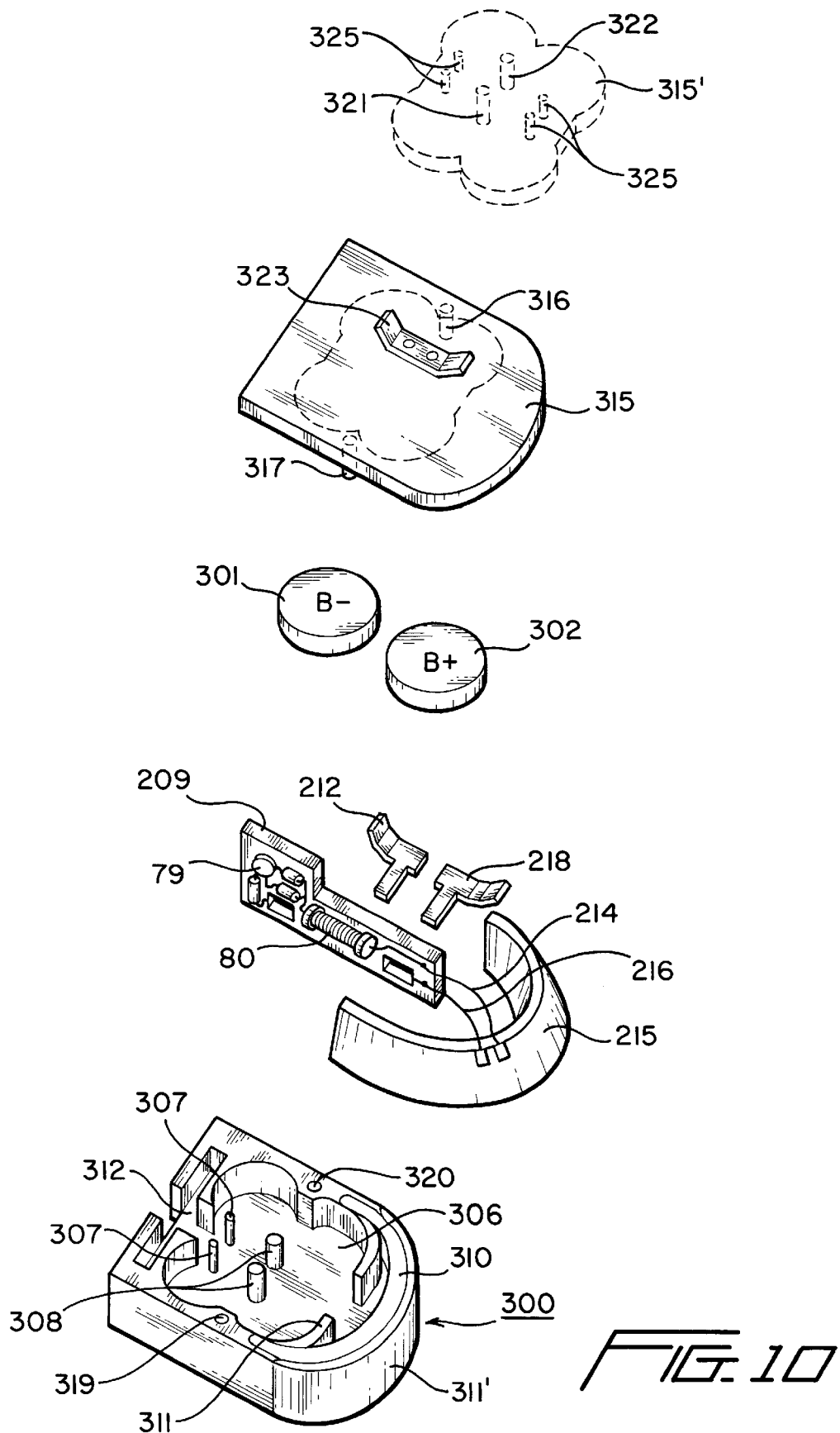

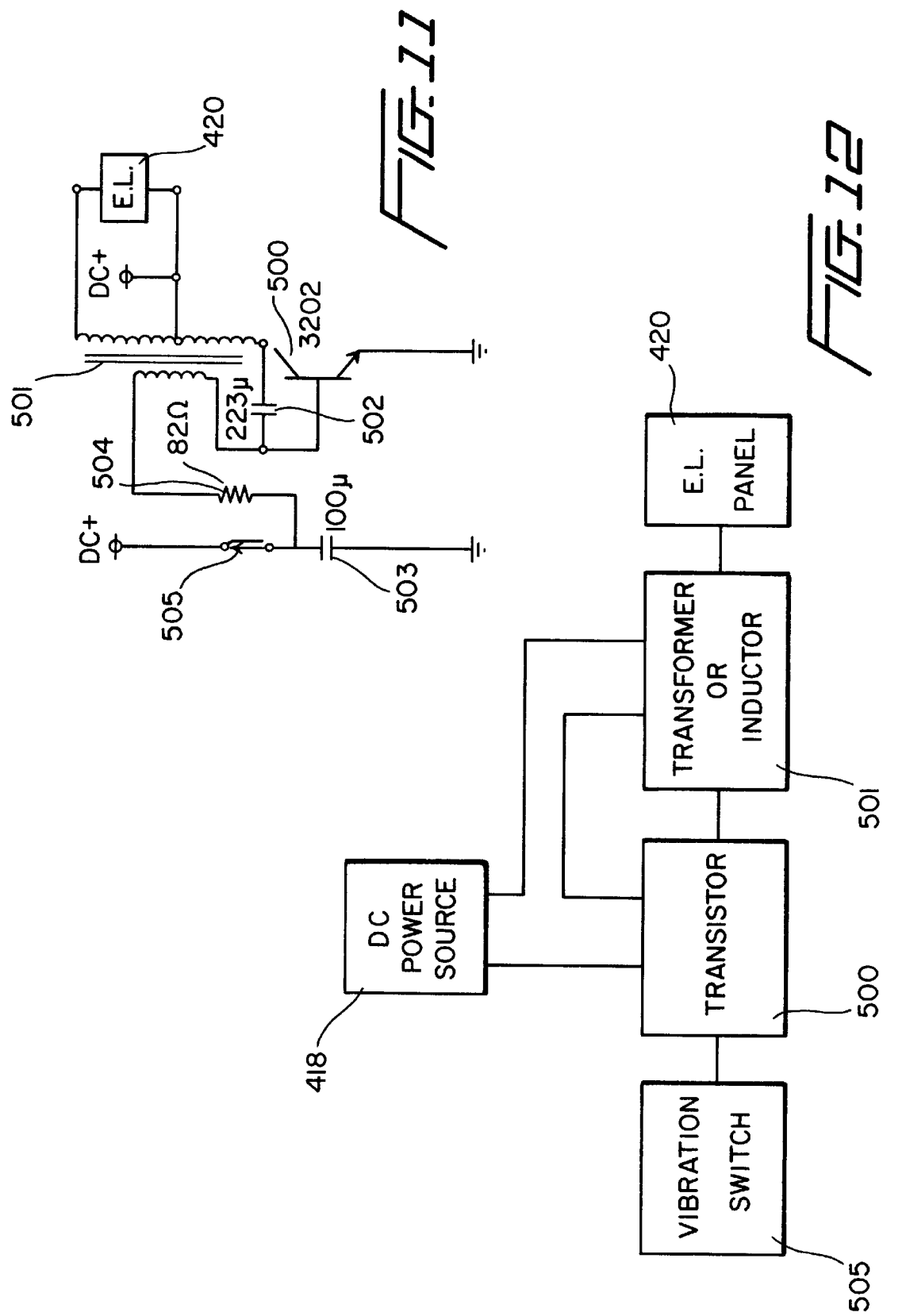

UNIVERSAL SAFETY LIGHT WITH EL ELEMENT

BACKGROUND OF THE INVENTION

1. Field of the Invention

This invention relates to the field of illumination, and in particular to a universal safety light in which illumination is provided by an electro-luminescent (EL) lighting element, and which includes a partially transparent housing arrangement containing the electro-luminescent lighting element and all necessary power supply and control circuitry.

2. Discussion of Related Art

While electro-luminescent lighting arrangements have been proposed for use in a variety of specific contexts relating to safety, including illumination of footwear, headwear, backpacks, safety guides, moving objects, and even flying objects, most of the previous proposals have involved separate illumination and power supply/control arrangements. The present invention relates to a self-contained universal safety light that can be used in a variety of applications, and which represents an improvement over both conventional safety light arrangements of the type utilizing LEDs and incandescent lights, and also over previous electro-luminescent lighting arrangements.

The advantages of electro-luminescent lighting relative to incandescent light are well-known, including both increased durability and flexibility. In addition, electro-luminescent lighting arrangements have a number of advantages over light emitting diode (LED) lighting arrangements, including color choice and brightness (the brightest LEDs are red, which can generally only be used for emergency lighting), increased viewing angle, flexibility, low power consumption, and the ability to be printed with designs for an attractive daytime appearance. In addition, electro-luminescent lighting elements can be arranged to exhibit special effects such as flashing in a variety of patterns.

In addition, electro-luminescent lighting elements can now be arranged as three-dimensional electro-luminescent fibers or tubes, often provided as "do-it-yourself" lighting kits, with changeable colors and a 360° viewing angle, the fibers or tubes changing color in response to a sensor for controlling the voltage or frequency of the electrical trigger current supplied to the electro-luminescent element for an exceptionally attractive lighting display.

Even though the improvement in visibility and attractiveness of electro-luminescent lights in comparison with ordinary LED warning lights, such as the ones described in U.S. Pat. Nos. 5,463,537 and 5,371,662, and even the improved LED shoe module described in copending U.S. patent application Ser. No. 08/517,502, now U.S. Pat. No. 5,599,088 is immediately apparent, however, problems in implementation have prevented widespread use of electro-luminescent lighting elements in most applications.

Despite the advantages of electro-luminescent lighting elements, substitution of electro-luminescent lighting elements for LEDs is not simply a matter of design choice, given the different electrical requirements and structures of LEDs and electro-luminescent light elements. From an electrical standpoint, for example, while LEDs can utilize either DC power or relatively low frequency pulses, electro-luminescent lighting arrangements require high frequency AC power supplies. Converting the output of a DC power source to the frequencies and voltages necessary to trigger an electro-luminescent lighting element involves either high labor cost traditional analog circuitry, or relatively expensive integrated circuits, and it is difficult to fit such circuitry into limited spaces such as might be available in the heel of a shoe, a bicycle warning light, or a flashlight.

Conventional electrical circuit arrangements for powering LEDs, such as described in U.S. Pat. Nos. 5,175,528, 5,313,187, and 5,313,188, which provide a square wave output for maximizing the efficiency of LEDs, do not provide a practical means for powering an electro-luminescent lighting arrangement, and conventional circuitry specifically designed for electro-luminescent lighting arrangements have tended to be expensive and difficult to implement in contexts where cost and space are considerations, such as in a safety light of the type with which the present invention is concerned.

The basic approach of the present invention is therefore to provide a safety light in which LEDs are replaced by electro-luminescent lighting elements, which may be conventional electro-luminescent lighting elements or three-dimensional electro-luminescent fibers, but in which the electro-luminescent lighting elements are arranged in a novel and especially efficient manner. The starting point is the LED lighting module described in U.S. patent application Ser. No. 08/517,502, now U.S. Pat. No. 5,599,088 which itself offers a number of improvements over conventional flasher modules, including power supply arrangement, but which suffers from the limited color choice (basically, red) and narrow viewing angle of traditional LED arrangements. Instead of directly substituting electro-luminescent lighting elements, including strips, tubes, panels, and three-dimensional fibers for LEDs in the lighting module of the copending application, however, the present invention makes a number of modifications to the prior module in order to make the substitution possible in a commercially viable manner, and which enables use in a wide variety of applications (which is why the invention is referred to as a "universal" safety light).

SUMMARY OF THE INVENTION

It is accordingly a first objective of the invention to provide a safety light which utilizes electro-luminescent lighting elements such as electro-luminescent strips or three-dimensional fibers instead of LEDs, and which is suitable for use in a wide variety of applications.

It is a second objective of the invention to provide a universal safety light having increased color selection or and design flexibility, including the possible of changeable colors, providing both a variety of illumination patterns and decorative non-illuminated effects.

It is a third objective of the invention to provide a universal electro-luminescent safety light having an improved power supply circuit arrangement which can be assembled by simply connecting two electrodes of an electro-luminescent lighting element to a circuit, and yet which can be arranged in a variety of patterns and to exhibit a variety of special effects, in two or three dimensions.

It is a fourth objective of the invention to provide a universal electro-luminescent safety light having an improved power supply circuit arrangement utilizing a reduced number of simple electrical components, including a single transistor, two capacitors, three resistors, and a single transformer, for forming an inverter system with a flasher capable of activating two or three dimensional electro-luminescent lighting arrangements and which has lower cost than LED lighting circuitry with comparable functions.

It is a fifth objective of the invention to provide a universal electro-luminescent safety light having an improved A/C inverter system including an transformer or inductor designed to take up a minimal amount of space for use in a wide variety of applications, including footwear modules, with a size of only 42 mm length by 26 mm wide by 9.5 mm in thickness (or 20 mm×20 mm×8 mm or 30 mm×20 mm×6 mm) when utilizing an inductor having a 2 mm diameter or a transformer having a 6 mm diameter.

It is a sixth objective of the invention to provide a universal electro-luminescent safety light in which all components including the electro-luminescent lighting element, DC power source or generator, electrical circuitry, function interface device, switch, and all related components fit within a single housing unit.

It is a seventh objective of the invention to provide a universal safety light including attachment means for attaching the light to a wide variety of objects, including clips, extensions arranged to fit into corresponding openings, or adapters for various brackets.

In its broadest form, these objectives of the invention are achieved by providing a universal safety light includes a partially transparent housing enclosing an electro-luminescent element and a transparent area for enabling viewing of the electro-luminescent element, the housing also enclosing a DC power source or generator and all electrical circuit means required for supplying power from said DC power source to said electro-luminescent element, including an AC/DC inverter circuit and a switch for turning said electro-luminescent element on and off, and an attachment device for attaching the housing to a variety of objects.

More specifically, the objectives of the invention are achieved by providing a housing having a transparent area arranged to provide optical effects, i.e., to change the path of light emitted from the electro-luminescent element in order to enhance visibility, a removable device to facilitate battery replacement, and a space inside the housing which accommodates all components including the electro-luminescent lighting element, DC power source, electrical circuitry, function interface device, switch, and all related components.

In the various preferred embodiments of the invention, the optical effects can advantageously be obtained by forming the transparent portion of the housing so as to include convex or concave surfaces, or surfaces of different thicknesses, in order to provide reflective or transmissive, diffraction effects, using a two-dimensional or three-dimensional lighting element, and thereby simulate, for example, a neon tube.

In addition, further patterns and effects can be achieved by decorating the electro-luminescent element or the transparent area by stencil, masking, or silkscreening, or by arrangement of the electro-luminescent particles, thereby providing messages when the electro-luminescent element is turned off.

The switch of used in the various embodiments of the invention can include one or more mechanical or electric switches sensitive to conditions such as ambient light, vibrations, humidity, heat, sound, tilt, movement of a rolling ball, and so forth, while the power and control circuitry can include a transformer or inductor with additional parts such as a transistor, resistor, capacitor, and function interface such as an IC to obtain one for more light performance effects such as chasing, flashing, steady on, random, fade-in/fade out, and so forth.

In one embodiment of the invention, the universal safety light is formed from two or more pieces, including a lower housing and an at least partially transparent cover, the lower housing having a special design so as to accommodate all electric parts and a special design for affixing a wide variety of different attachment means to the housing, while in another embodiment of the invention the lower housing includes the transparent portion and the cover supports battery contacts, and in yet another embodiment of the invention, the housing is formed from three parts, including upper and lower housing members and a separate transparent cover.

BRIEF DESCRIPTION OF THE DRAWINGS

FIG. 1-1 is a perspective view showing a variation of the universal safety light of FIG. 1.

FIG. 3-1 is a schematic circuit diagram of the circuit illustrated in FIG. 3.

FIG. 3-2 is a functional block diagram of the circuit illustrated in FIG. 3-1.

FIG. 8 is a perspective view of a universal safety light constructed in accordance with the principles of a third preferred embodiment of the invention.

FIG. 8-1 is a schematic circuit diagram of the circuit illustrated in FIG. 8.

FIG. 8-2 is a perspective view of a battery holder for use in the universal safety light illustrated in FIG. 8.

FIG. 9 is a perspective view of a universal safety light constructed in accordance with the principles of a fourth preferred embodiment of the invention.

FIG. 9-1 is a perspective view showing details of the circuit board used in the universal safety light of FIG. 9.

FIG. 9-2 is a perspective view of a cover for the universal safety light illustrated in FIG. 9.

FIG. 10-1 is a perspective view showing a variation of the embodiment illustrated in FIG. 10.

FIG. 10-2 is a perspective view showing a further variation of the embodiment illustrated in FIG. 10.

FIG. 10-3 is a perspective view of a shoe incorporating the universal safety light of FIGS. 10, 10-1, and 10-2.

FIG. 10-4 is a bottom view of the shoe illustrated in FIG. 10-3.

FIG. 11 is a schematic block diagram of a circuit for use in the embodiment of FIGS. 10 to 10-4.

FIG. 12 is a functional block diagram of the circuit illustrated in FIG. 11.

DETAILED DESCRIPTION OF THE PREFERRED EMBODIMENTS

Figures 1, 10:
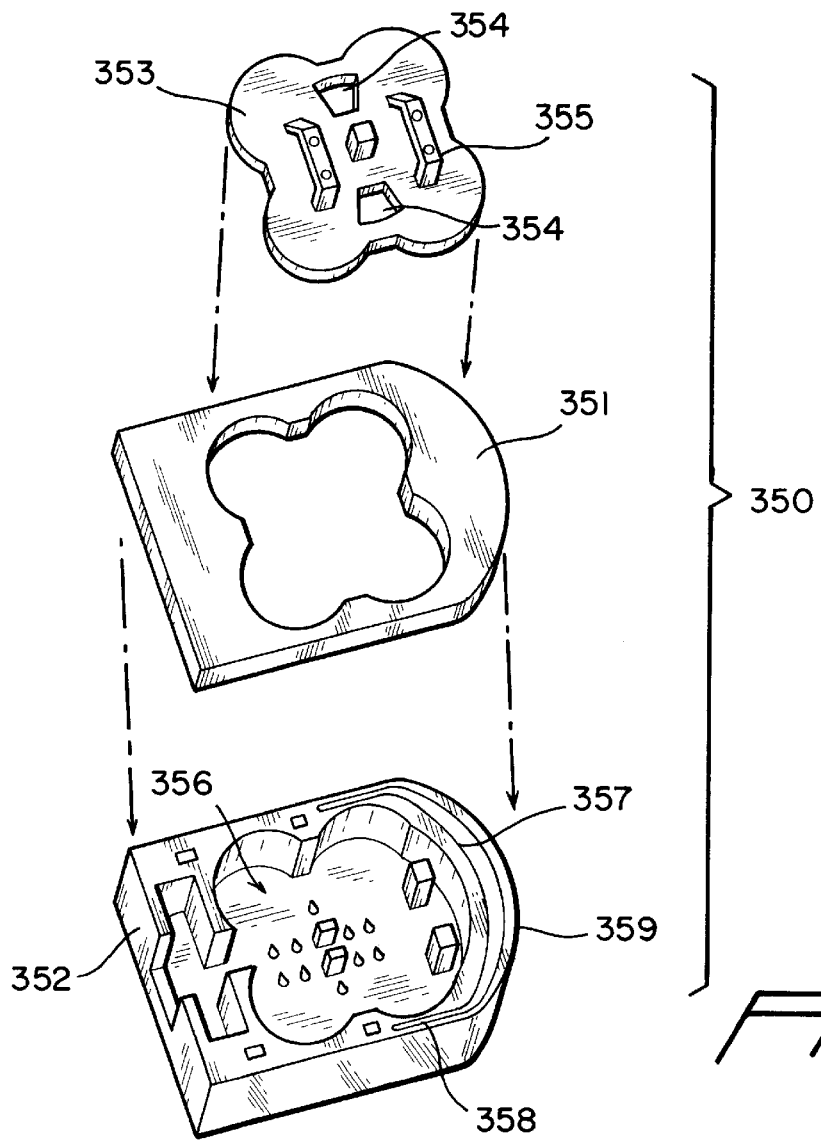
FIG. 1 is a perspective view of a universal safety light constructed in accordance with the principles of a first preferred embodiment of the invention.
FIG. 10 is a perspective view of a universal safety light constructed in accordance with the principles of a fifth preferred embodiment of the invention.
Figures 2, 10:
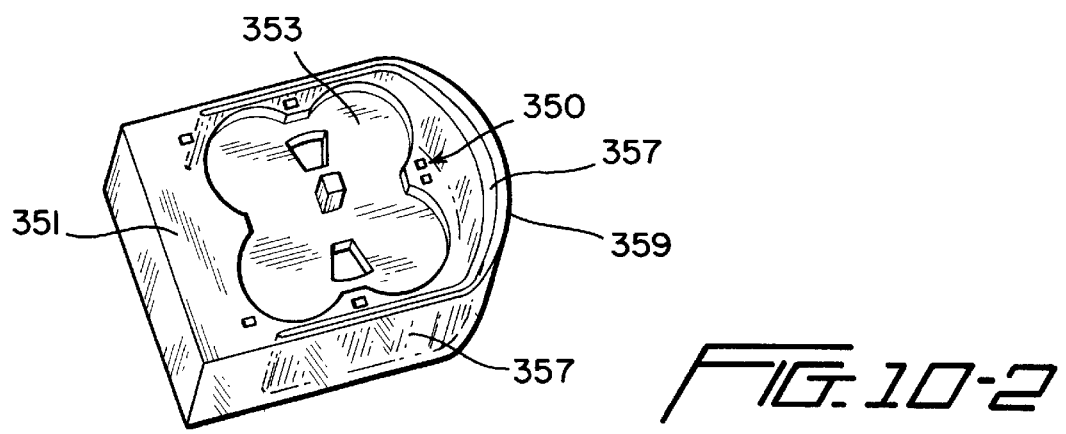
Figures 3, 10:
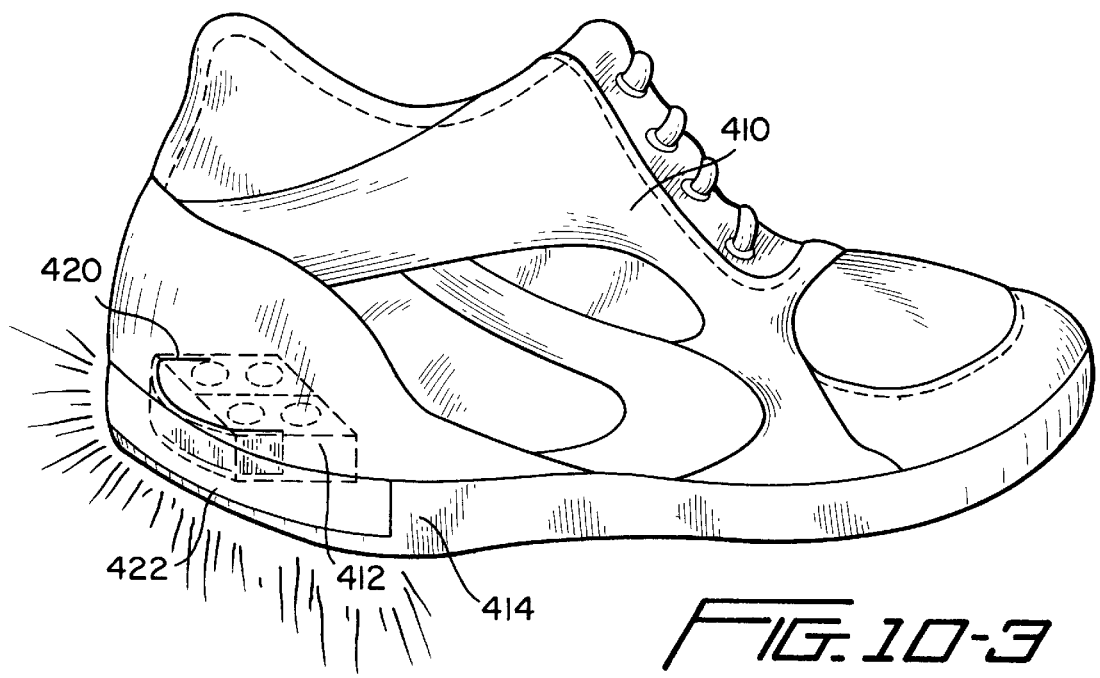
Figures 4, 10:
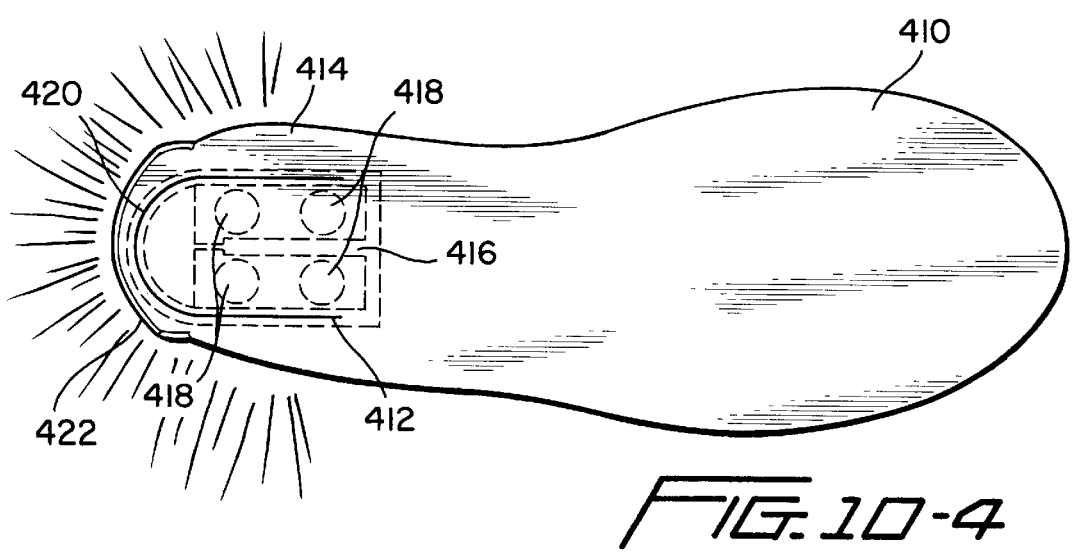

As illustrated in FIG. 1, a first preferred embodiment of the invention includes a housing made up of a generally rectangular lower housing 1 and a generally rectangular transparent cover 2. Enclosed within the lower housing 1 and cover 2 is a printed circuit board 3, on one side of which is mounted an electro-luminescent element 4, which could be in the form of a panel 4, a flat strip, or a tube-shaped fiber 4', for example, and on the other side of which is mounted electrical power supply and control circuitry including a transformer 5, switch 6, and additional components 7 to be described in more detail below.

The lower housing 1 includes battery contacts 8 for conventional dry cell batteries 9 and means for mounting the circuit board 3 and means for connecting the battery contacts 8 to the electrical circuitry on the circuit board. Also included in lower housing 1 is an opening 10 for enabling a user to access the switch 6 by pushing on a flexible transparent cover 11 that extends through and seals the opening 10. The transparent cover 2 is mounted to the lower housing 1 and sealed by a gasket 12 positioned at the interface between the transparent cover and the lower housing. In addition, the embodiment of FIG. 1 includes attachment means in the form of a belt clip 17 for attaching the illustrated universal safety light to an object (not shown), which can be integrally molded with the lower housing member or be in the form of a discrete member secured to the lower housing member. By way of example, the attachment means could be attached to a bicycle's reflector bracket by inserting a screw through opening 17".

As illustrated in FIG. 1, the cover 2 includes means for providing various optical designs to enhance the visibility and/or attractiveness of light emitted by the electro-luminescent panel 4, including a transparent portion shaped to provide convex lenses 13 and a concave lens 14, as well as a reflective portion 16. The optical design means may also include other means for optically varying light passing through a transparent material, such as diffraction gratings, a diffractive portion having varying thicknesses, a focusing portion, or a partially reflective portion, or a translucent portion for diffusing light, and the transparent material can be colored in any color or color combination.

In the embodiment illustrated in FIG. 1, as well as in the other embodiments of the invention, the housing and transparent area can be formed by injection molding, and the parts contained within the housing may secured by means selected from the group consisting of screws, snaps, hooks, ultrasonic seals, hot melted seals, and solvents.

In a variation of the first embodiment of the invention, as illustrated in FIG. 1-1, the housing includes a generally circular, rather than rectangular, lower housing 18 and a generally circular transparent cover 19, and a circuit board 20 mounted in the lower housing 18 by a screw 21 and location post 22 extending through respective openings 23 and 24 in the circuit board. The circuit board 20 has mounted on one side electrical circuit components 25, including a switch 26 and battery contacts 27, and is semi-circular in shape to leave space in the lower housing for battery holder slots 28, with button type batteries 29 being secured in slots 28 and electrically connected to each other by a bracket/contact 30 secured by a screw 31.

As in the embodiment of FIG. 1, the lower housing 18 of the embodiment of FIG. 1-1 includes an opening 32 to permit access to switch 26 via a flexible switch cover 33 which extends through and seals the opening. Again, an electro-luminescent panel 34 is mounted on the opposite side of the circuit board from the electrical circuit components 25 so as to be visible through optical elements molded into the transparent cover 19, including a convex lens 35 and a reflective portion 36, the transparent cover 19 being affixed to the lower housing and optionally sealed by a circular gasket (not shown) at the interface between the lower housing and transparent cover. Also, as in the embodiment of FIG. 1, an attachment means 17' in the form of a clip is secured to the outside of the lower housing.

Figures 2, 3:
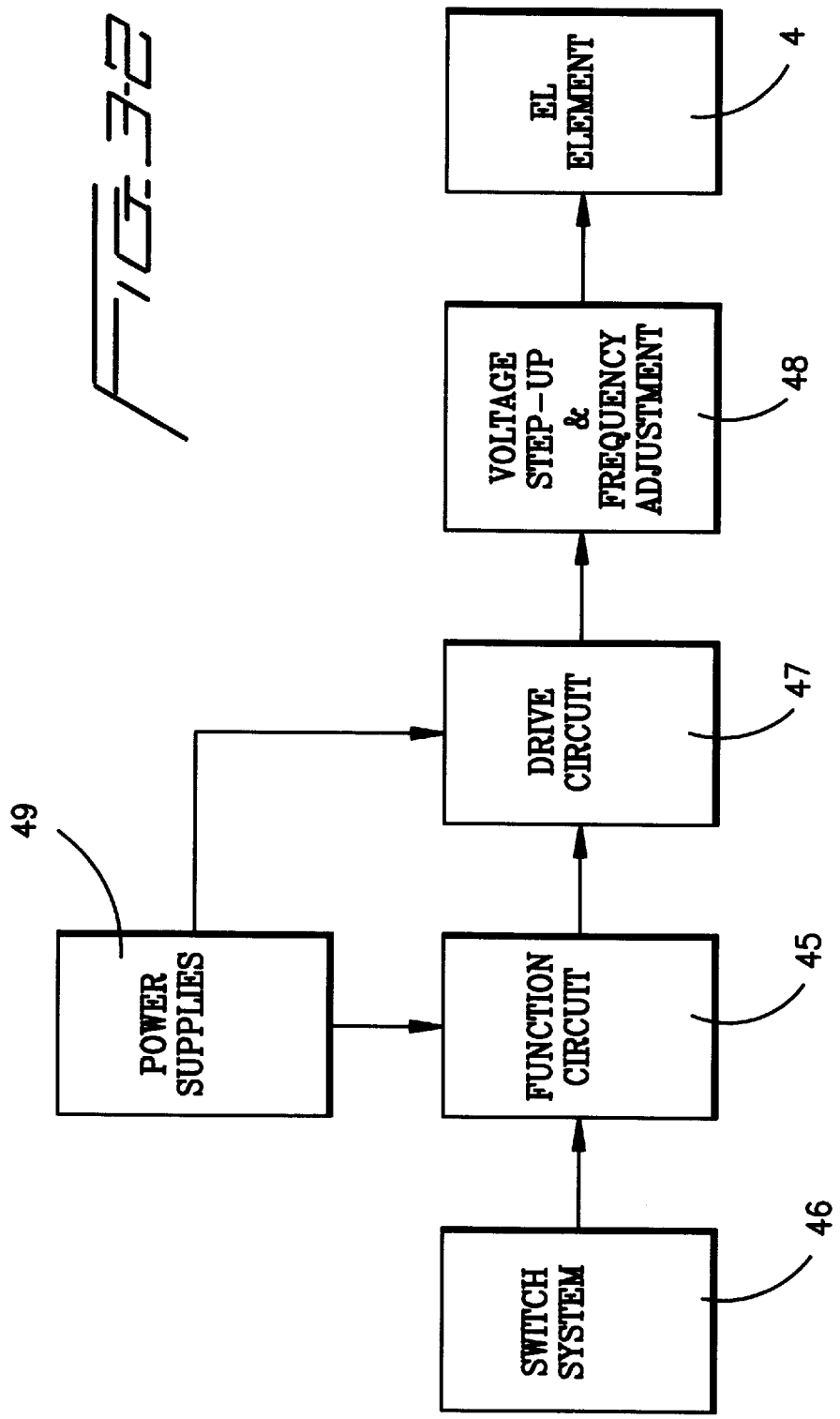
FIG. 2 is a perspective view showing details of a variation of the universal safety light of FIG. 1.
FIG. 3 is a perspective view showing details of one of the basic circuit boards that could be used in the variation illustrated in FIG. 2.

Turning to the embodiment of FIG. 2, in which the respective parts are numbered identically to those illustrated in FIG. 1, the universal safety light includes a lower housing 1 and at least partially transparent cover 2 corresponding to the housing 1 and cover 2 illustrated in FIG. 1, and an electro-luminescent panel 4 electrically connected to the printed circuit board 3 by means of crimp terminals 37 and wires extending through openings 38 in the circuit board, the circuit board being mounted to the lower housing by partition walls 39 which may, for example, engage slots (not shown) in the circuit bearing side of the circuit board 4, with the battery contacts 8 for batteries 9 being affixed to walls 40 and the batteries being further located by walls 41. Instead of a simple o-ring type gasket, the sealing gasket 12' of this embodiment is shaped to provide a better seal when the cover 2 is secured to the lower housing 1.

As illustrated in greater detail in FIG. 3, the circuit board 4 housed within the universal safety light of FIG. 2 supports transformer 5 and switch 6, while the additional circuit components 7 are in the form of a transistor 42, three capacitors 43 (only two of which are shown in FIG. 3, and three resistors 44 (only two of which are shown), connected in the manner illustrated in FIG. 3-1 to cause the electro-luminescent light to flash or remain steady, thereby providing a function circuit corresponding to element 45 in FIG. 3-2, with switch 6 corresponding to the switch system 46, transistor 42 to the drive circuit 47, transformer 5 to the voltage raising and frequency adjustment circuit 48 of FIG. 3-2, and the illustrated batteries to power supplies 49.

The reason that FIG. 3-2 uses generic terms for the specific circuit components illustrated in FIG. 3-1 is of course that the specific circuit elements illustrated in FIG. 3-1 can be replaced by other circuits which perform the functions represented in FIG. 3-2, for example by including in the inverter circuit a function interface having means for outputting pulses which enable the electro-luminescent element to be turned on for various periods of time to provide special effects selected from the group consisting of flashing, steady-on, chasing, random, and fade-in/fade-out effects.

It will be appreciated by those skilled in the art that while a single manual switch is illustrated in FIGS. 1 to 3-2, the switch used in the various embodiments of the invention can include not only a manual switch, but also one or more mechanical or electric switches sensitive to conditions such as ambient light, vibrations, humidity, heat, sound, tilt, movement of a rolling ball, and so forth.

Figure 4:
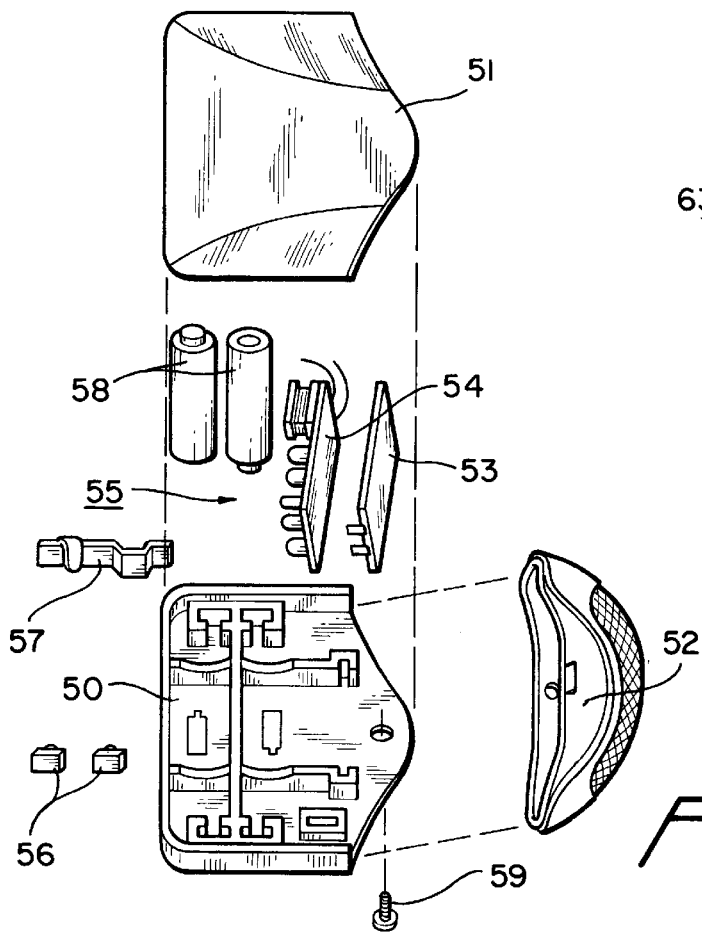
FIG. 4 is a perspective view of a universal safety light constructed in accordance with the principles of a second preferred embodiment of the invention.

In contrast to the two-piece housings of the universal safety light of the above-described embodiments, in the embodiment illustrated in FIG. 4, the housing is constructed of both a lower housing 50 and an upper housing 51, and completed by an optical lens member 52 on one side of the housing. The electro-luminescent panel 53 and circuit board 54 including and electrical components 55 of this embodiment can be the same as in the embodiments of FIGS. 1 and 3, except that the circuit board and panel are oriented perpendicularly relative to the lower and upper housings, and the battery contacts 56 and 57 for batteries 58 are situated on the side of the circuit board facing away from the optical lens member 52, which may again contain various optical designs for enhancing the visibility or attractiveness of light emitted by the electro-luminescent panel. The optical lens member may be secured to the lower housing by a screw 59 or by any other convenient securing means and the entire housing assembly may be sealed by a appropriate gaskets (not shown) if desired.

It is noted that the battery contacts in this embodiment include two single contacts 56 and one common contact 57 to provide a series connection, although whether the batteries are connected in series or parallel depends solely on the electrical requirements of the circuit on the circuit board.

Figure 7:
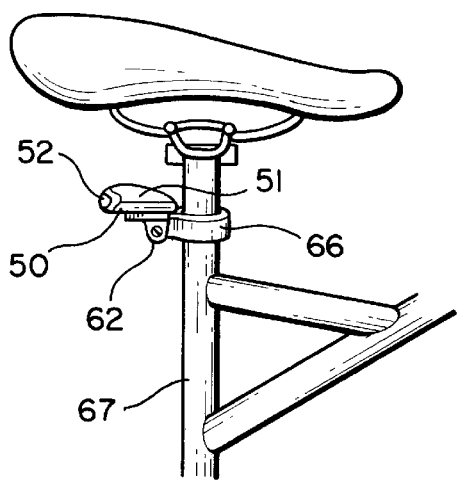
FIG. 7 is a further perspective view of the attachment means illustrated in FIGS. 5 and 6.
Figure 5:
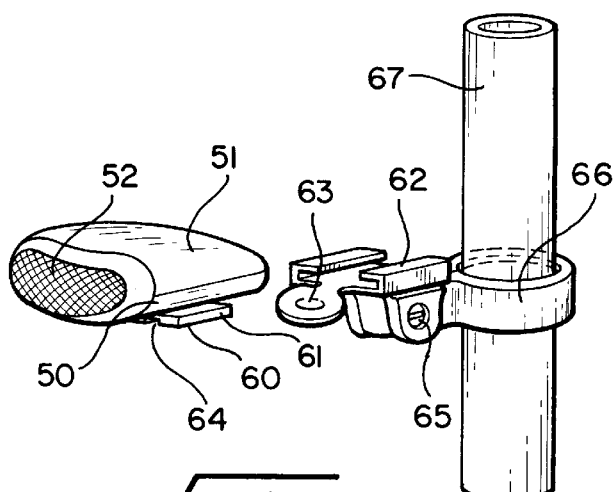
FIG. 5 is a perspective view of an attachment means for use with the universal safety light of the invention.
Figure 6:
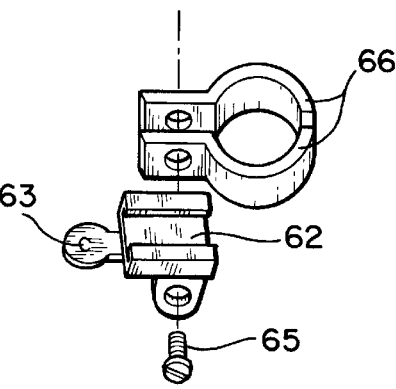
FIG. 6 is a perspective view showing details of the attachment means illustrated in FIG. 5.

By providing suitable attachment means 60, the universal safety light illustrated in FIG. 4 may be mounted on, for example, a bicycle, as illustrated in FIGS. 5–7. In this example, the attachment means includes a flange 61 arranged to fit within slots formed in a cooperating adapter 62 and held by a tab 63 on the adapter and opening 64 in the attachment means, adapter 62 in turn being attached by a screw 65 to a post bracket 66 for mounting on the handlebar stem or seat post 67 of the bicycle frame.

The embodiment illustrated in FIG. 8, like that of FIGS. 1 and 3, includes a two-piece housing made up of a lower housing 68 secured to an at least partially transparent cover 69 via a rubber gasket 70, the transparent cover including optical designs, illustrated as being in the form of magnifying lenses 71, with the housing containing a circuit board 72 on which is mounted a switch 73 accessible through a switch cover 74 extending through and sealing an opening 74' in the lower housing. The attachment means 75 of this embodiment includes a clip 76 secured to the lower housing by a screw 77 and bolt 78.

Instead of the traditional analog circuit of the previous embodiments, however, the circuit board 72 shown in FIG. 8 includes an integrated circuit 79 and inductor 80 as part of the power supply and control circuitry for electro-luminescent panel 81, and the batteries 82 are in the form of button cell batteries positioned within a battery holder 83, with the transparent cover 69 secured to the lower housing 68 by hooks 84 which enable the transparent cover to be removed in order to access the battery holder 83 and thereby enable removal and replacement of the batteries, and the circuit board 72 being secured by posts 84' and hooks 84".

As illustrated in FIGS. 8-1 and 8-2, the integrated circuit 79, which is a commercially available device, supplies output pulses at a desired frequency and timing to a transistor 85 connected to the inductor 80 when the switch 73 is activated, with the only other required components being a capacitor 86 and resistor 87. The inclusion of the additional components depends of course on the requirements of the integrated circuit chosen to supply the desired control pulses to transistor 85, as does details of the component mounting and connections to the electro-luminescent panel, for example by using surface mounting of the components and connection to the electro-luminescent panel by wires 88.

By using an improved A/C inverter system including an transformer or inductor designed to take up a minimal amount of space, the housing of the above embodiments can have a size of as small as 42 mm length by 26 mm wide by 9.5 mm in thickness (or 20 mm×20 mm×8 mm or 30 mm×20 mm×6 mm), utilizing a conventional inductor having a 2 mm diameter or a transformer having a 6 mm diameter.

The embodiment illustrated in FIGS. 9, 9-1, and 9-2 is similar to that disclosed in U.S. patent application Ser. No. 08/383,405, filed Feb. 3, 1995, and is especially suitable for use in applications where space is limited, with control being provided by an integrated circuit and inductor to form the DC/AC inverter (described in more detail below) so as to minimize the physical size of the circuit components. On the other hand, it will be appreciated by those skilled in the art that a transformer could easily be substituted for the inductor to provide the same function.

The universal safety light of this embodiment includes a main housing 124 having a base 125 and walls 126–129, cover post receiving openings 130–132, and battery isolation terminals 133 all integrally molded together. The upper housing or cover 138, shown upside-down in FIG. 9-2, in turn includes a plurality of press-fit mounting posts 139–141 having diameters slightly larger than those of openings 130–132 to provide a removable press-fit engagement between the cover and the main housing when posts 139–141 are inserted into openings 130–132, and a pair of upper conductive terminals 142 and 143 fastened to the cover by mounting posts 144–147.

The preferred method of fastening the terminals is to stake them onto the mounting posts by inserting the mounting posts through holes in the terminals and melting the ends of the posts to form an expanded section which serves to retain the terminals on the posts, although those skilled in the art will appreciate that numerous other terminal mounting methods may be substituted. As illustrated, the terminals each have battery contact engagement portions 148–151 extending at an angle from the cover so as to bias the batteries in place in the main housing and establish a good electrical connection between both terminals of the batteries and the corresponding terminals or contacts in the housing. A preferred angle for the battery engagement portions is 45°.

The main housing 124 and cover 125 of this embodiment are generally rectangular but transparent wall 129 is curved to provide a wider viewing angle and facilitate mounting in footwear. Main housing 124 also includes a groove 154 formed between wall 129 and an internal wall 155 for accommodating electro-luminescent strip 156.

Preferably, electro-luminescent strip 156 includes discrete electro-luminescent particle sections 157 to save power and reduce costs while providing expanded design possibilities. As illustrated, strip 156 includes a central terminal connection to which connection wires 158 are affixed by a pin-in/rivet arrangement, a pad, a crimp arrangement, claw terminals, or any other conventional electro-luminescent strip termination arrangement, for connection to a circuit board 160 which is positioned between the internal wall 155 of the main housing 124 and the battery isolating posts 133, with the batteries being positioned between the battery isolating posts 133 and the rear and side walls 126–128 of the housing. Alternatively, a three-dimensional electro-luminescent fiber element could be used to provide a 360° viewing angle.

Included on the circuit board 160 are a motion sensing switch 161, a common negative power terminal 163, and positive power terminals 164 and 165. Preferably, the common negative power terminal 163 is connected to a pair of individual negative contacts 166 and 167, while the positive power terminals are connected respectively connected to individual positive contacts 168 and 169. Contacts 166–168 extend rearwardly from the circuit board 160 when the circuit board is positioned in the main housing such that the contacts extend under the batteries 170–173, which are positioned over the contacts by the posts 133, the batteries being biased against contacts 166–168 by respective contact portions 148–151 of the upper contacts, thus providing for easy installation and replacement of the batteries with good electrical contact in an especially compact structure.

As illustrated, one of the electro-luminescent panel connecting wires 158 is connected to the common negative battery terminal 163 on circuit board 160, and the other of the two wires 158 is connected to switch 161. Switch 161 is in turn connected by traces to the positive terminals 164 and 165 of the power supply and may be of the type illustrated in the above-mentioned U.S. patent application Ser. No. 08/383,405, including a coil spring contact 180, a coil spring contact mounting member or bracket 181, and an outer contact member 182, the outer contact member 182 being illustratively semi-cylindrical in shape, although those skilled in the art will appreciate that the contact could extend through any desired angle up to 360°.

FIGS. 10 and 10-1 illustrate an alternative version of the light module of FIGS. 9, 9-1, and 9-2. In this version, the circuit board is in the form of an L-shaped member 210, with one side having printed thereon a positive voltage trace 209 extending from a terminal 211 arranged to receive a first battery contact 212, contact 212 being arranged to contact the positive terminal of a battery and ending at the terminal pad of a switch corresponding to that shown in FIG. 9, the opposite side of the switch being further connected by a positive trace to the positive voltage lead 214 of an electro-luminescent panel 215.

In this version of the preferred embodiment, the negative lead 216 of the electro-luminescent panel 215 extends along the opposite side of the circuit board to a negative contact terminal 217 arranged to receive a negative battery contact 218. Both the positive and negative battery contacts 212 and 218 including battery engagement sections 219–221 extending at an angle of, for example, 45° from the main section of the contacts to provide a biasing force which ensures a good electrical connection between the contacts and the battery terminals. Connection to the circuit board member 210 is by means of tabs 222,223 on the contacts which extend into the slots which form terminals 211,217.

The universal safety light of the embodiment illustrated in FIGS. 10 and 10-1 enables the batteries to be removed without touching the other electrical components, and includes a main housing 300 in which the circuit board 210, LED 215, and batteries 301–304 are accommodated. To this end, the main housing 300 includes a main compartment having posts 307 extending thereinto for supporting the circuit board, and posts 308 for also supporting the circuit board, with the circuit board thereby dividing the compartment 306 into a two sections with batteries 301 and 302 on one side, the positions of the batteries being further established by curved portions 309 of the outer wall of the main housing. Optionally, posts 308 may also serve to receive press fit pins extending from the cover, as will be explained below.

With the circuit board illustrated in FIG. 10 positioned in the compartment 306 by means of posts 307 and 308, electro-luminescent panel 215 fits into a groove 310 formed by an internal wall 311 and a transparent outer wall 311' which can be shaped to provide optical effects if desired. The contacts 212 extend through slots from one side of the board with batteries 301 and 302 being placed on top of the contacts 212.

As shown in FIG. 10, the main housing 300 can accommodate two different press-fit covers 315 and 315', the difference being that cover 315 is press-fit by means of pins 316 and 317 to respective openings 319 and 320 in the outer wall of the housing, and alternative cover 315' is press-fit by means of pins 321 and 322 posts 308. Each of the alternative covers shares, however, upper battery contact 323, which is preferably secured to the covers by mounting pins 325 staked to openings 326 in the contact, with angled sections 327 of contact 323 being arranged in the illustrated example to engage respective negative and positive terminals of batteries 301 and 302.

The variation of the preferred embodiment of FIG. 10 illustrated in FIG. 10-2 uses a cover made up of a protective member 351 permanently secured to the main housing 352 and a removable press-fit cap 353 having openings 354 through which the user can insert the tip of a pen or the like in order to facilitate removal of the cap. In this embodiment, cap 353 includes a press fit pin 355, while the battery compartment includes various molded-in posts 356 for positioning the circuit board, positioning and isolating the batteries from each other and the circuit board, and cooperating with the press-fit pin 355. In addition, the main housing 352 of this variation also includes a compartment 357 for accommodating the electro-luminescent panel 358, the compartment including a transparent wall 359.

FIGS. 10-3 and 10-4 show an application of the universal safety light illustrated in FIGS. 10, 10-1, and 10-2 to a shoe, and in particular to the heel or outsole 414 of a shoe 410. In this Figure, the safety light is designated by the reference numeral 412, a transparent area of the sole or outsole by reference numeral 422, the circuit board by reference numeral 416, the batteries by reference numeral 418, and the electro-luminescent light panel of the safety light by reference numeral 420. Those skilled in the art will appreciate that safety light 412 of this embodiment could be used in a variety of footwear and other applications.

An alternative and especially simple electric circuit arrangement for the footwear module illustrated in FIGS. 10-3 and 10-4 includes an DC/AC inverter circuit made up of a transistor 500 having a collector electrode connected to is the secondary winding of transformer 501 and a base electrode connected to the primary winding of the transformer, a capacitor 502, a capacitor 503, resistor 504, and vibration-sensitive switch 505. In order to simply this circuit even further, the transformer could be eliminated, with the secondary winding of the transformer being replaced by an inductor as in the circuit of FIG. 8-1, but without the need for an integrated circuit controller if switching is to be carried out solely by the vibration sensitive switch.

Having thus described various preferred embodiments of the invention, with a number of different features, it should be appreciated that each of the embodiments of the invention also shares several common features, set forth in the appended claims, that are intended to characterize the invention. These common features include the use of a housing having at least one transparent area for enabling viewing of an electro-luminescent element situated within the housing, and yet which also provides space for all other electrical circuit elements required by the electro-luminescent element, thus providing a completely self-contained universal safety light which can easily be adapted for use in a wide variety of applications. Despite the common features, however, and the fact that a number of different embodiments of the invention have been described in detail, it is anticipated that numerous further variations and modifications of the preferred embodiments will occur to those skilled in the art without departing from the scope of the invention, and it is accordingly intended that the invention not be limited by the above description or accompanying drawings, but that it be defined solely in accordance with the appended claims.

We claim:

1. A universal safety light, comprising:
   a housing enclosing an electro-luminescent element and a transparent area for enabling viewing of the electro-luminescent element, said housing also enclosing a DC power source and all electrical circuit means required for supplying power from said DC power source to said electro-luminescent element, including an AC/DC inverter circuit and a switch for turning said electro-luminescent element on and off according to predetermined times and cycles; and
   attachment means for attaching said housing to a variety of objects,
   wherein said electro-luminescent element is positioned on one side of a circuit board and at least a portion of said electrical circuit means are mounted on a second side of the circuit board.

2. A universal safety light as claimed in claim 1, wherein the transparent area comprises a transparent material.

3. A universal safety light as claimed in claim 2, wherein the transparent material forms an optical design means for optically varying light passing through the transparent material.

4. A universal safety light as claimed in claim 1, wherein the transparent material can be colored.

5. A universal safety light as claimed in claim 1, wherein the housing includes a lower housing member and an at least partially transparent cover.

6. A universal safety light as claimed in claim 5, further comprising a gasket provided between the lower housing and the transparent cover for sealing the housing to protect the electro-luminescent lighting element and electrical components enclosed therein.

7. A universal safety light as claimed in claim 5, wherein said transparent cover is removable from the lower housing to permit access to the DC power source so that the DC power source can be replaced by a user of the safety light.

8. A universal safety light as claimed in claim 1, wherein the housing includes a lower housing member, and upper housing member, and a separate front member which forms said transparent area.

9. A universal safety light as claimed in claim 8, wherein said attachment means comprises means for attaching the housing to a post.

10. A universal safety light, comprising:
    a housing enclosing an electro-luminescent element and a transparent area for enabling viewing of the electro-luminescent element, said housing also enclosing a DC power source and all electrical circuit means required for supplying power from said DC power source to said electro-luminescent element, including an AC/DC inverter circuit and a switch for turning said electro-luminescent element on and off according to predetermined times and cycles; and
    attachment means for attaching said housing to a variety of objects,
    wherein said housing comprises a main housing and a cover, and said transparent area comprises an external wall of the main housing, said external wall and an internal wall of the main housing forming a groove for supporting the electro-luminescent element behind the transparent area.

11. A universal safety light as claimed in claim 1, wherein the electro-luminescent element is a single member having discrete electro-luminescent particle areas and a common electrode.

12. A universal safety light as claimed in claim 1, wherein the inverter circuit includes a function interface having means for outputting pulses which enabling the electro-luminescent element to be turned on for various periods of time to provide special effects selected from the group consisting of flashing, steady-on, chasing, random, and fade-in/fade-out effects.

13. A universal safety light as claimed in claim 1, wherein the A/C inverter includes an element selected from the group consisting of a transformer and an inverter, said element being arranged to output to the electro-luminescent pulses having a desired voltage and frequency.

14. A universal safety light as claimed in claim 1, wherein the A/C inverter includes an integrated circuit for controlling a transistor connected to a transformer or inductor for supplying power of a desired voltage and frequency to the electro-luminescent element.

15. A universal safety light as claimed in claim 1, wherein the DC power source includes a plurality of batteries and the housing includes a battery holder arranged to facilitate removal of the batteries.

16. A universal safety light as claimed in claim 1, wherein the attachment means is molded with the housing.

17. A universal safety light as claimed in clam 1, wherein the attachment means comprises a discrete member attached to the housing.

18. A universal safety light as claimed in claim 1, wherein the housing and transparent area are formed by injection molding, and the parts contained within the housing are secured by means selected from the group consisting of screws, snaps, hooks, ultrasonic seals, hot melted seals, and solvents.

19. A universal safety light as claimed in claim 1, where the electro-luminescent element is an element selected from the group consisting of electro-luminescent panels, flat electro-luminescent strips, three-dimensional electro-luminescent fiber arrangements, and three-dimensional electro-luminescent tubes.

20. A universal safety light as claimed in claim 3, wherein said optical design means is selected from the group consisting of a concave lens, a convex lens, and an at least partially reflective member.

21. A universal safety light as claimed in claim 1, wherein said housing includes integral means for mounting at least one power source terminal, said power source being positioned between the power source terminal and the circuit board.

* * * * *